US012629697B2

(12) United States Patent
Deng et al.

(10) Patent No.: US 12,629,697 B2
(45) Date of Patent: May 19, 2026

(54) ORE DRESSING PROCESS FOR MEDIUM-GRADE AND LOW-GRADE MIXED COLLOPHANITE

(71) Applicant: Institute of Multipurpose Utilization of Mineral Resources, CAGS, Chengdu (CN)

(72) Inventors: Shanzhi Deng, Chengdu (CN); Jie Deng, Chengdu (CN); Xinhua Zhang, Chengdu (CN); Da Chen, Chengdu (CN); Shiqiang Yan, Chengdu (CN); Jun Song, Chengdu (CN)

(73) Assignee: INSTITUTE OF MULTIPURPOSE UTILIZATION OF MINERAL RESOURCES, CAGS, Chengdu (CN)

( * ) Notice: Subject to any disclaimer, the term of this patent is extended or adjusted under 35 U.S.C. 154(b) by 886 days.

(21) Appl. No.: 17/593,847

(22) PCT Filed: Feb. 4, 2021

(86) PCT No.: PCT/CN2021/075250
§ 371 (c)(1),
(2) Date: Sep. 26, 2021

(87) PCT Pub. No.: WO2021/179862
PCT Pub. Date: Sep. 16, 2021

(65) Prior Publication Data

US 2022/0184637 A1 Jun. 16, 2022

(30) Foreign Application Priority Data

Mar. 10, 2020 (CN) ........................ 202010161569.1
Mar. 10, 2020 (CN) ........................ 202010161579.5

(51) Int. Cl.
*B03D 1/002* (2006.01)
*B03B 9/00* (2006.01)
*B03D 1/02* (2006.01)

(52) U.S. Cl.
CPC ................ *B03D 1/002* (2013.01); *B03B 9/00* (2013.01); *B03D 1/021* (2013.01); *B03D 2203/06* (2013.01)

(58) Field of Classification Search
CPC .... B03D 1/002; B03D 1/021; B03D 2203/06; B03D 1/085; B03B 9/00; B03B 7/00
See application file for complete search history.

(56) References Cited

U.S. PATENT DOCUMENTS 4,364,824 A * 12/1982 Snow ..................... B03D 1/002 209/172.5
2014/0110621 A1* 4/2014 Kerns .................... B03D 1/016 252/61

FOREIGN PATENT DOCUMENTS

CN 101791592 A * 8/2010
CN 101797536 A * 8/2010
(Continued)

OTHER PUBLICATIONS

Huang Chenli, Annual Review of Chinese Phosphate Mineral Processing in 2018, Xingfa School of Mining Engineering, Wuhan Institute of Technology. (Year: 2018).*
(Continued)

*Primary Examiner* — Patrick Orme
*Assistant Examiner* — Boi-Lien Thi Nguyen
(74) *Attorney, Agent, or Firm* — Bayramoglu Law Offices LLC

(57) ABSTRACT

An ore dressing process for medium-grade and low-grade mixed collophanite includes the following steps: S1; crushing ores to obtain crushed ores; S2: screening the crushed ores to obtain fine-fraction ores and coarse-fraction ores
(Continued)

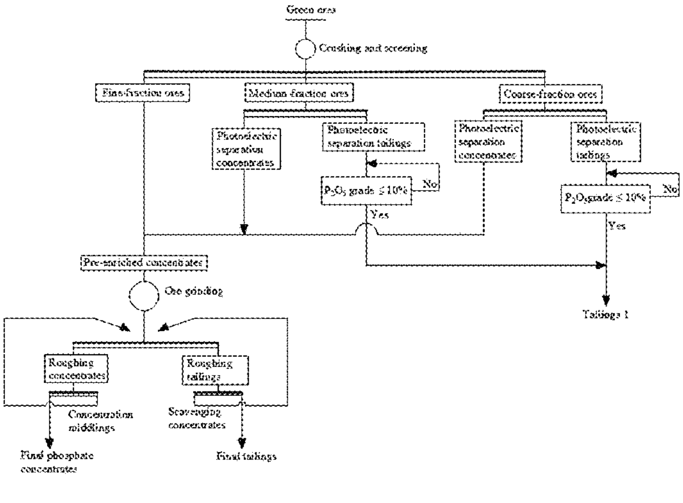

divided into at least two size fractions; S3: performing a photoelectric separation to the coarse-fraction ores of different size fractions to obtain photoelectric separation concentrates and photoelectric separation tailings of each size fraction; S4: combining the photoelectric separation concentrates of the each size fraction to obtain pre-enriched concentrates; S5: combining the fine-fraction ores and the pre-enriched concentrates, and then performing an ore grinding to obtain minerals to be separated; S6: adding water to the minerals to be separated to obtain a floatation pulp, and then performing a floatation to obtain phosphate concentrates and tailings.

12 Claims, 1 Drawing Sheet

(56) References Cited

FOREIGN PATENT DOCUMENTS

| | | | | | |
|---|---|---|---|---|---|
| CN | 101905190 | A | * | 12/2010 | |
| CN | 101983776 | A | * | 3/2011 | |
| CN | 102259063 | A | * | 11/2011 | |
| CN | 103480483 | A | * | 1/2014 | |
| CN | 103480483 | B | | 8/2015 | |
| CN | 104826740 | A | * | 8/2015 | |
| CN | 105268560 | A | * | 1/2016 | ............ B03D 1/018 |
| CN | 105597939 | A | * | 5/2016 | |

OTHER PUBLICATIONS

Li Ning, Application Practice and Evaluation of Photoelectric Separation in a Phosphate Mining Industry, 2018, Yunnan Phosphate Chemical Group Co. Ltd and National Engineering and Technology Center for Development & Utilization of Phosphor Resources. (Year: 2018).*

Tang, Ya-fei, The Influence of Phosphates on the Flotation of Collophane and Dolomite, 1989, Chemical Mining Technology. (Year : 1989).*

Ning (Li Ning, Application Practice and Evaluation of Photoelectric Separation in a Phosphate Mining Industry, 2018, Yunnan Phosphate Chemical Group Co. Ltd and National Engineering and Technology Center for Development & Utilization of Phosphor Resources) (Year: 2018).*

Huang (Journal of Wuhan Institute of Technology 2019 Issue 06 559-565 Online: Jan. 24, 2021 ISSN: 1674-2869 CN: 42-1779) (Year : 2019).*

Liu (Minerals Engineering, vol. 109, Aug. 1, 2017, pp. 162-168) (Year: 2017).*

Ayorinde (Rapid Commun. Mass Spectrom. 14, 608-615 (2000)) (Year: 2000).*

Cheng (Advanced Materials Research, Online: Jan. 29, 2015, ISSN: 1662-8985, vol. 1089, pp. 59-64) (Year: 2015).*

Huang Chenlei, et al., Annual Review of Chinese Phosphate Mineral Processing in 2018, Journal of Wuhan Institute of Technology, 2019, pp. 559-565, vol. 41 No. 6.

Li Ning, et al., Application Practice and Evaluation of Photoelectric Separation in a Phosphate Mining Industry, Non-Metallic Mines, 2018, pp. 73-75, vol. 41 No. 2.

Yafei Tang, The Influence of Phosphate on the Flotation of Collophanite and Dolomite, Chemical Mining Technology, 1989, pp. 20-23, vol. 18 No. 3.

Fang Li, Study on the Evaluation Method of Phosphate Flotation Collector, Wuhan Institute of Technology, 2012, pp. 71,76-77.

Jingsheng Zhang, Mine Medicament, 2008, Metallurgical Industry Press.

* cited by examiner

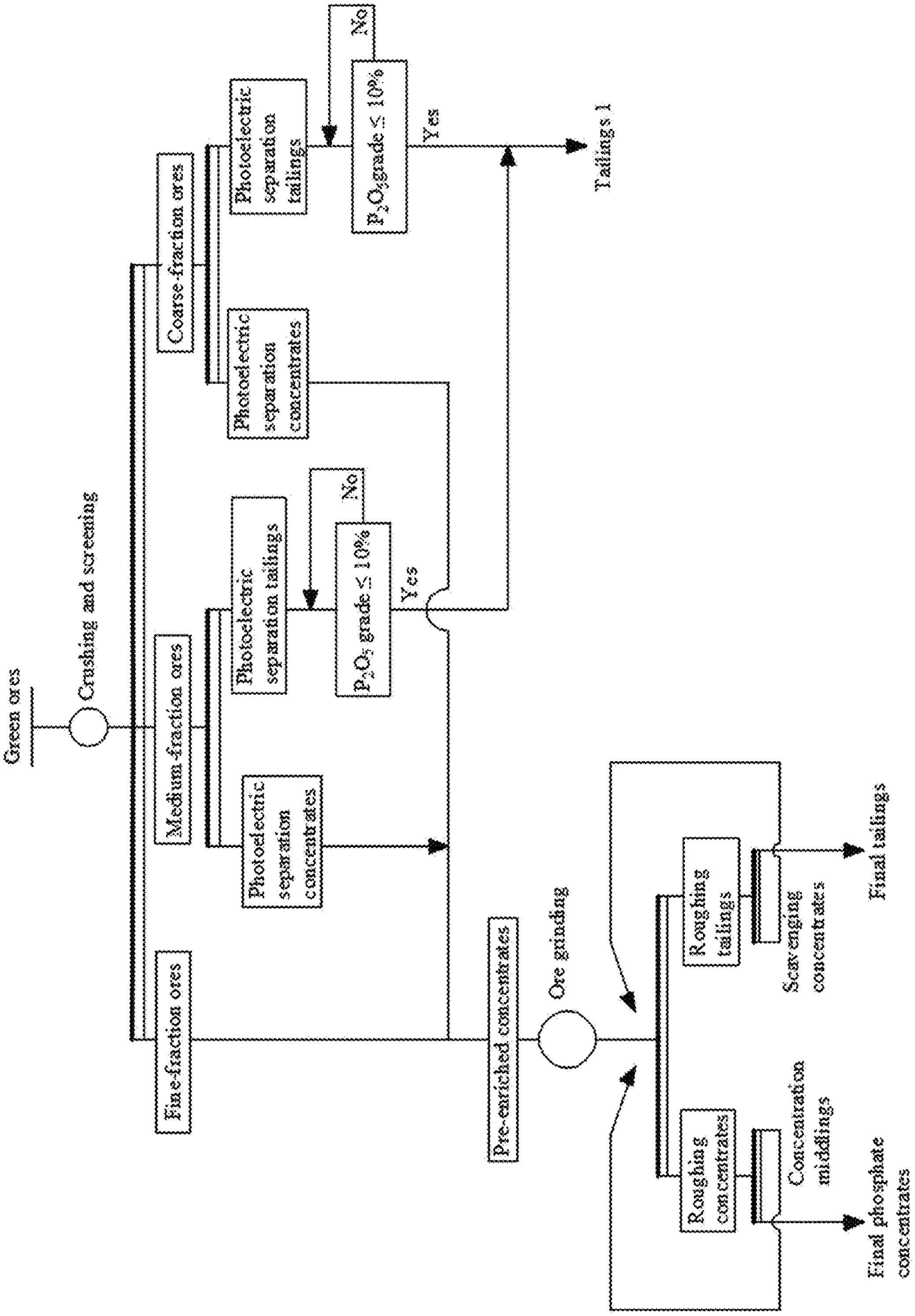
Green ores
Crushing and screening
Fine-fraction ores
Medium-fraction ores
Coarse-fraction ores
Photoelectric separation concentrates
Photoelectric separation tailings
Photoelectric separation concentrates
Photoelectric separation tailings
$P_2O_5$ grade ≤ 10%
No
Yes
$P_2O_5$ grade ≤ 10%
No
Yes
Tailings 1
Pre-enriched concentrates
Ore grinding
Roughing concentrates
Roughing tailings
Concentration middlings
Scavenging concentrates
Final phosphate concentrates
Final tailings

ORE DRESSING PROCESS FOR MEDIUM-GRADE AND LOW-GRADE MIXED COLLOPHANITE

CROSS REFERENCE TO RELATED APPLICATIONS

This application is the national stage entry of International Application No. PCT/CN2021/075250, filed on Feb. 4, 2021, which is based upon and claims priority to Chinese Patent Application No. 202010161579.5 filed on Mar. 10, 2020, and Chinese Patent Application No. 202010161569.1 filed on Mar. 10, 2020, the entire contents of which are incorporated herein by reference.

TECHNICAL FIELD

The present application relates to the technical field of collophanite ore dressing, in particular to an ore dressing process for medium-grade and low-grade mixed collophanite.

BACKGROUND

As a major chemical raw material, phosphate ore is widely used in agriculture, food, medicine and other fields, which is closely related to people's daily life. At the same time, it is also a non-renewable and non-recyclable resource. The distribution characteristics of phosphate resources are represented as relatively concentrated and uneven in regions. The world's phosphate resources are mainly distributed in Africa, Asia, South America, North America and the Middle East. The phosphate resources of only Morocco and Western Sahara, China, the United States, South Africa and Russia account for more than 80% of the world's total phosphate reserves. The distribution of the phosphate resources in these countries and regions is relatively concentrated. For example, the phosphate resources in Hubei, Guizhou, Yunnan, Hunan and Sichuan account for 76.3% of China's total phosphate resources, and mixed phosphate resources account for about 50% of China's total phosphate resources.

Gangue minerals in mixed collophanite are complex, and contain carbonate and silicate gangue minerals. The existing mixed phosphate ore dressing process mainly includes direct and reverse floatation or double reverse floatation. Its principle is to remove silicate and carbonate minerals in ores by changing floatation mediums or regulators, so as to obtain qualified phosphate concentrate. However, there are many problems in both the direct and reverse floatation process and the double reverse floatation process, such as long process, complex medium, large consumption of chemicals and difficulty in tail water treatment, which lead to the problems of high mixed collophanite ore dressing cost, low ore dressing efficiency and great environmental pollution.

Chinese patent literature CN201310472014.9, filed on Oct. 11, 2014, titled "Phosphate Dense Medium Mineral Separation and Direct-Reverse Floatation Combined Technology", discloses an ore dressing process, which includes a phosphate coarse particle heavy-medium ore dressing process and a direct and reverse floatation process after grinding of heavy-medium tailings discharged from the heavy-medium ore dressing process. The technical solution can reduce the discharge amount of tailings after phosphate heavy-medium ore dressing and improve the utilization rate of phosphate resources, but the heavy-medium recovery and reuse cost is high, and the subsequent direct and reverse floatation process requires regulation of the pH value of the pulp, which is easy to cause the problems of high cost of chemicals for ore dressing and great backwater treatment difficulty.

Chinese patent literature CN201510991054.3, filed on Dec. 25, 2015, titled "Process for Mineral Processing of Low-Grade Silicon Calcium Collophanite", discloses a process for mineral processing of low-grade silicon calcium collophanite, which sequentially includes crushing, ball milling, floatation decarbonization, direct floatation roughing, reverse floatation roughing and reverse floatation scavenging. The technical solution requires fine particle size for floatation, the grinding energy consumption is high and the chemical consumption is great, which is not an energy-saving consumption-reducing environment-friendly ore dressing technology.

To sum up, there are some problems in the prior art, such as high cost and great chemical consumption in floatation of mixed collophanite.

Therefore, we urgently need a low-grade mixed collophanite ore dressing process which can improve ore dressing efficiency and has the advantages of simple operation, low cost and environmental friendliness at the same time.

SUMMARY

The purpose of the present application is to overcome the defects of the prior art and provide an ore dressing process for medium-grade and low-grade mixed collophanite, which includes photoelectric separation and single reverse floatation processes, and can achieves the effects of high ore dressing efficiency, small amount of ores for floatation, low energy consumption, low floatation chemical cost and environmental friendliness by reducing silicon through photoelectric separation and removing magnesium through floatation.

The purpose of the present application is achieved by adopting the following technical solution: an ore dressing process for medium-grade and low-grade mixed collophanite, which includes the following steps:

S1; crushing green ores to obtain crushed ores;

S2: screening the crushed ores to obtain fine-fraction ores and coarse-fraction ores divided into at least two size fractions;

S3: respectively performing photoelectric separation to the coarse-fraction ores of different size fractions to obtain photoelectric separation concentrates and photoelectric separation tailings of each size fraction, wherein due to the adsorption and adhesion of fine-fraction materials in photoelectric separation equipment, which affect the photoelectric separation effect, the photoelectric separation effect is capable of being improved by limiting the particle size of the fine-fraction ores and the coarse-fraction ores, and only performing photoelectric separation to the coarse-fraction ores;

S4: combining the photoelectric separation concentrates of each size fraction to obtain pre-enriched concentrates;

S5: combining the fine-fraction ores and the pre-enriched concentrates, and then performing ore grinding to obtain minerals to be separated;

S6: adding water to the minerals to be separated to obtain floatation pulp, and then performing floatation to obtain final phosphate concentrates and final tailings.

Through the above technical solution, by removing silicon and discarding the tailings through the photoelectric separation of medium-grade and low-grade mixed collophanite under the condition of coarse size fraction, the present application not only avoids the influence of siliceous gangue on the subsequent floatation operation, but also achieves the effects of reducing the treatment amount of subsequent ore grinding, reducing the ore grinding power consumption, greatly reducing the floatation chemical consumption and thus saving the production cost. The main gangue minerals in the solution include dolomite, quartz, chalcedony, and so on. At the same time, since the grade of silicon in raw ores has been reduced to 3%-4% through photoelectric separation, magnesium can be removed by combining with single reverse floatation, and the effect of improving ore dressing efficiency is achieved.

It should be noted that the photoelectric separation in the prior art is actually a color-based separation process by using the color difference between ores, while the photoelectric separation in the present application is actually an XRD separation process, that is, separation is carried out through the difference between X-ray absorption values of different minerals. The two processes are substantively different.

Although in general, the finer the crushing particle size is, the better the separation effect is, the crushing particle size is not always the finer the better, but the condition of ore separation is reached, that is, the useful minerals and gangue minerals can be separated in the process of crushing and grinding. In the ore dressing process defined by the present application, in the case of coarse crushing particle size, some gangue minerals have been separated from useful minerals, which meets the premise of ore separation. Therefore, photoelectric separation may be directly performed to remove gangue minerals and realize discarding tailings in advance, so as to achieve the effects of effectively reducing the subsequent treatment amount, reducing the cost and improving the efficiency.

In the prior art, only when the weight percentage of ground ores with a particle size of −200 mesh is 80% can floatation be performed, so the grinding amount is large and the cost is high. However, in the present application, the separation of siliceous gangue minerals can be realized under the condition of particle size of 10 mm, thus effectively reducing the subsequent treatment amount of the mill and reducing the energy consumption of the mill.

In some implementations, in S1, the grade of phosphate in the green ores is 17%-22%, the grade of $P_2O_5$ is less than 18% and the grade of $SiO_2$ is more than 10%.

In some implementations, the particle size of the crushed ores is less than or equal to 60 mm.

In some implementations, in S2, the particle size of the fine-fraction ores is less than or equal to 8 mm.

In some implementations, in S2, the particle size of the coarse-fraction ores is more than 8 mm.

In some implementations, in S3, the ore dressing process further includes a step of respectively and repetitively performing photoelectric separation by using the photoelectric separation tailings of each size fraction as raw materials.

In some implementations, in S3, the grade of $P_2O_5$ in the photoelectric separation tailings at the last time is less than or equal to 10%.

In some implementations, in S5, the weight percentage of the minerals with a particle size less than or equal 0.074 mm in the ore pulp to be separated is 75%-90%. At this time, mineral particles are most likely to combine with chemical molecules to form effective mineralized froth to complete the separation.

In some implementations, in S6, the floatation includes at least one time of roughing, at least one time of concentration and at least one time of scavenging.

Further, in S6, the mass percent concentration of the floatation pulp is 25%-35%, and effective floatation can be ensured at this time.

Further, in S6, the floatation includes one time of roughing, one time of concentration and one time of scavenging, and includes the following steps:

A1: adding an inhibitor and a collector into the floatation pulp, and performing stirring and aeration to obtain roughing concentrates and roughing tailings;

A2: adding an inhibitor and a collector into the roughing concentrates, and performing stirring and aeration to obtain the final phosphate concentrates and concentration middlings;

A3: adding an inhibitor and a collector into the roughing tailings, and performing stirring and aeration to obtain scavenging concentrates and final tailings.

In some implementations, the concentration middlings and scavenging concentrates may be respectively returned to step A1 and steps A1-A3 are repeated.

Through the above technical solution, the intermediate products obtained in one time of roughing, one time of concentration and one time of scavenging in floatation are further separated, thus achieving the effect of improving the yield of the final phosphate concentrates.

In some implementations, the inhibitor is mixed acid.

In some implementations, the inhibitor includes 4-6 parts of sodium tripolyphosphate, 2-3 parts of hexametaphosphate and 2-3 parts of phosphoric acid by weight.

Through the above technical solution, the mixture of sodium tripolyphosphate, hexametaphosphate and phosphoric acid is used as the inhibitor, and the phosphate ion and phosphoric acid ion with high degree of polymerization are selectively adsorbed on the surface of apatite minerals through a synergistic action to form a high hydrophilic surface, thus enhancing the hydrophobicity difference between the apatite minerals and the gangue mineral, hindering the combination of collector molecules and apatite minerals, increasing the selective inhibition of the inhibitor on the apatite minerals in the floatation pulp, making the collector molecules be more effectively adsorbed on the surface of calcium magnesium minerals, and effectively improving the separation effect of the apatite minerals; At the same time, the inhibitor avoids the use of a large amount of sulfuric acid in the floatation process, increases the pH value of the floatation pulp to about 6.5, effectively reduces the erosion of the acidic pulp to the floatation equipment, and greatly prolongs the service life of the equipment.

In some implementations, the collector includes 4-5 parts of sodium vegetable oleate and 1 part of dodecyl phosphate by weight. The sodium vegetable oleate is prepared from NaOH solution and vegetable oil.

Through the above technical solution, since the sodium vegetable oleate contains a large amount of unsaturated fatty acids, it has stronger selectivity and is easier to form stable valence bonds on the mineral surface in the pulp solution. Therefore, under the action of the inhibitor, the sodium vegetable oleate and dodecyl phosphate can closely combine with the ions exposed on the surface of the gangue minerals in the pulp to form a stable hydrophobic surface, thus enhancing the collector's ability to collect dolomite minerals in the pulp, and achieving the effects of improving the selectivity and collection performance and effectively ensuring that the apatite minerals and the gangue minerals can still be separated effectively when the grade of ores to be separated is low, In some implementations, a method for preparing the collector includes adding NaOH solution into mixed solution of vegetable oil and dodecyl phosphate, and performing heating for reaction to obtain.

In some implementations, the vegetable oil includes at least one of cottonseed oil, rice bran oil, castor oil, corn oil and soybean oil. Cottonseed oil is preferred since it contains more unsaturated fatty acids and short-chain fatty acids.

In some implementations, the weight ratio the NaOH solution to the mixed solution is 0.1-0.2:1. In some implementations, the mass percent concentration of NaOH is 20%.

Specifically, the concentration of the NaOH solution may be adaptively adjusted according to the prior art.

In some implementations, the reaction temperature of the heating for reaction is 60-80° C. and the reaction time is 3-5 h.

In some implementations, in A1, the amount of the added inhibitor is 2000-3000 g/t green ore and/or the amount of the added collector is 400-800 g/t green ore.

In some implementations, in A2, the amount of the added inhibitor is 400-600 g/t green ore and/or the amount of the added collector is 40-80 g/t green ore.

In some implementations, in A3, the amount of the added inhibitor is 800-1200 g/t green ore and/or the amount of the added collector is 150-250 g/t green ore.

The present application has the following beneficial effects:

1. In the ore dressing process for medium-grade and low-grade mixed collophanite provided by the present application, by removing impurities and reducing silicon through photoelectric separation of the medium-grade and low-grade mixed collophanite, the influence of siliceous gangue on subsequent floatation operation is avoided; at the same time, by removing magnesium through single reverse floatation, the effect of improving the ore dressing efficiency is achieved.

2. In the ore dressing process for medium-grade and low-grade mixed collophanite provided by the present application, by removing the gangue mineral impurities under the condition of coarse particle size, the ore grinding energy consumption and floatation chemical consumption are greatly reduced, the production energy consumption is effectively reduced and the production cost is reduced.

3. In the ore dressing process for medium-grade and low-grade mixed collophanite provided by the present application, by adding phosphates with high degree of polymerization into the inhibitor, the selective inhibition effect of the inhibitor on the apatite minerals in the floatation pulp is increased, the collector molecules can be more effectively adsorbed on the surface of calcium magnesium minerals, and the effect of effectively improving the separation of the apatite minerals is achieved.

4. In the ore dressing process for medium-grade and low-grade mixed collophanite provided by the present application, by adding the vegetable oil into the collector, the effect of enhancing the collector's ability in collecting dolomite in the pulp is achieved.

BRIEF DESCRIPTION OF THE DRAWINGS

FIGURE illustrates a flowchart of ore dressing process for medium-grade and low-grade mixed collophanite provided by the present application.

DETAILED DESCRIPTION OF THE EMBODIMENTS

The technical solution of the present application will be further described below in detail with reference to the drawings, but the scope of protection of the present application is not limited thereto.

Example 1

Medium-grade and low-grade mixed collophanite was obtained from a certain ore dressing plant in Mabian region, the grade of $P_2O_5$ was 22%, and the ore dressing process was as illustrated in the FIGURE, which included the following steps:

In S1, green ores were crushed to obtain crushed ores with a particle size less than or equal to 60 mm.

In S2, the crushed ores are screened to obtain fine-fraction ores with a particle size less than or equal to 8 mm and coarse-fraction ores of two different size fractions of +8-30 mm and +30-60 mm.

In S3, photoelectric separation was respectively performed to the coarse-fraction ores of the different size fractions, samples were enabled to enter a separator at speed of 3 m/s, the samples were illuminated by using electromagnetic waves with a wavelength of 0.05 nm and separation was performed to obtain photoelectric separation concentrates and photoelectric separation tailings of each size fraction.

In S4, the photoelectric separation tailings of each size fraction were respectively returned to step S3, and the operation was repeated for 2-3 times until the grade of $P_2O_5$ in the photoelectric separation tailings was less than or equal to 10%, wherein photoelectric separation concentrates and photoelectric separation tailings were obtained at each time of photoelectric separation of each size fraction.

In S5, the obtained photoelectric separation concentrates were all combined to obtain pre-enriched concentrates; the obtained photoelectric separation tailings of different size fractions were combined to obtain tailings I.

In S6, the fine-fraction ores and the pre-enriched concentrates were combined, and then ore grinding was performed to obtain ore pulp to be separated, wherein the weight of minerals with a particle size less than or equal to 0.074 mm accounted for 75% of the total weight.

In S7, water was added to the ore pulp to be separated to obtain floatation pulp with mass percent concentration of 30%, and then floatation including one time of roughing, one time of concentration and one time of scavenging was performed to obtain final phosphate concentrates, wherein the specific operation included the following steps:

In A1, 2000 g/t green ore of an inhibitor and 400 g/t green ore of a collector were added into the floatation pulp, and stirring and aeration were performed to obtain roughing concentrates and roughing tailings.

In A2, 400 g/t green ore of an inhibitor and 40 g/t green ore of a collector were added into the roughing concentrates, and stirring and aeration were performed to obtain the final phosphate concentrates and concentration middlings.

In A3, 800 g/t green ore of an inhibitor and 150 g/t green ore of a collector were added into the roughing tailings, and stirring and aeration were performed to obtain scavenging concentrates and final tailings.

Herein, the concentration middlings and the scavenging concentrates were respectively returned to step A1, and steps A1-A3 were repeated.

The inhibitor included 4 parts of sodium tripolyphosphate, 2 parts of hexametaphosphate and 2 parts of phosphoric acid by weight. The collector included 4 parts of sodium vegetable oleate and 1 part of dodecyl phosphate by weight.

A method for preparing the collector included adding NaOH solution into mixed solution of vegetable oil and dodecyl phosphate, wherein the mass percent concentration of NaOH was 20%, and performing heating for reaction for 5 h at 60° C. to obtain.

Herein, the vegetable oil included cottonseed oil, rice bran oil, castor oil, corn oil and soybean oil. The weight ratio the NaOH solution to the mixed solution is 0.2:1.

Example 2

Medium-grade and low-grade mixed collophanite was obtained from a certain ore dressing plant in Leibo, the grade of $P_2O_5$ was 20%, and the ore dressing process was as illustrated in the FIGURE, which included the following steps:

In S1, green ores were crushed to obtain crushed ores with a particle size less than or equal to 60 mm.

In S2, the crushed ores are screened to obtain fine-fraction ores with a particle size less than or equal to 8 mm and coarse-fraction ores of two different size fractions of +8-30 mm and +30-60 mm.

In S3, photoelectric separation was respectively performed to the coarse-fraction ores of the different size fractions, samples were enabled to enter a separator at speed of 3 m/s, the samples were illuminated by using electromagnetic waves with a wavelength of 0.05 nm and separation was performed to obtain photoelectric separation concentrates and photoelectric separation tailings of each size fraction.

In S4, the photoelectric separation tailings of each size fraction were respectively returned to step S3, and the operation was repeated for 2-3 times until the grade of $P_2O_5$ in the photoelectric separation tailings was less than or equal to 10%, wherein photoelectric separation concentrates and photoelectric separation tailings were obtained at each time of photoelectric separation of each size fraction.

In S5, the obtained photoelectric separation concentrates were all combined to obtain pre-enriched concentrates; the obtained photoelectric separation tailings of different size fractions were combined to obtain tailings I.

In S6, the fine-fraction ores and the pre-enriched concentrates were combined, and then ore grinding was performed to obtain ore pulp to be separated, wherein the weight of minerals with a particle size less than or equal to 0.074 mm accounted for 85% of the total weight.

In S7, water was added to the ore pulp to be separated to obtain floatation pulp with mass percent concentration of 30%, and then floatation including one time of roughing, one time of concentration and one time of scavenging was performed to obtain final phosphate concentrates, wherein the specific operation included the following steps:

In A1, 2500 g/t green ore of an inhibitor and 600 g/t green ore of a collector were added into the floatation pulp, and stirring and aeration were performed to obtain roughing concentrates and roughing tailings.

In A2, 500 g/t green ore of an inhibitor and 60 g/t green ore of a collector were added into the roughing concentrates, and stirring and aeration were performed to obtain the final phosphate concentrates and concentration middlings.

In A3, 1000 g/t green ore of an inhibitor and 200 g/t green ore of a collector were added into the roughing tailings, and stirring and aeration were performed to obtain scavenging concentrates and final tailings.

Herein, the concentration middlings and the scavenging concentrates were respectively returned to step A1, and steps A1-A3 were repeated.

The inhibitor included 5.5 parts of sodium tripolyphosphate, 2.5 parts of hexametaphosphate and 2.5 parts of phosphoric acid by weight. The collector included 4.5 parts of sodium vegetable oleate and 1 part of dodecyl phosphate by weight.

A method for preparing the collector included adding NaOH solution into mixed solution of vegetable oil and dodecyl phosphate, wherein the mass percent concentration of NaOH was 20%, and performing heating for reaction for 4 h at 70° C. to obtain.

Herein, the vegetable oil included cottonseed oil, rice bran oil, castor oil, corn oil and soybean oil. The weight ratio the NaOH solution to the mixed solution is 0.2:1.

Example 3

Medium-grade and low-grade mixed collophanite was obtained from a certain ore dressing plant in Jinyang, the grade of $P_2O_5$ was 18%, and the ore dressing process was as illustrated in the FIGURE, which included the following steps:

In S1, green ores were crushed to obtain crushed ores with a particle size less than or equal to 60 mm.

In S2, the crushed ores are screened to obtain fine-fraction ores with a particle size less than or equal to 8 mm and coarse-fraction ores of two different size fractions of +8-30 mm and +30-60 mm.

In S3, photoelectric separation was respectively performed to the coarse-fraction ores of the different size fractions, samples were enabled to enter a separator at speed of 3 m/s, the samples were illuminated by using electromagnetic waves with a wavelength of 0.05 nm and separation was performed to obtain photoelectric separation concentrates and photoelectric separation tailings of each size fraction.

In S4, the photoelectric separation tailings of each size fraction were respectively returned to step S3, and the operation was repeated for 2-3 times until the grade of $P_2O_5$ in the photoelectric separation tailings was less than or equal to 10%, wherein photoelectric separation concentrates and photoelectric separation tailings were obtained at each time of photoelectric separation of each size fraction.

In S5, the obtained photoelectric separation concentrates were all combined to obtain pre-enriched concentrates; the obtained photoelectric separation tailings of different size fractions were combined to obtain tailings I.

In S6, the fine-fraction ores and the pre-enriched concentrates were combined, and then ore grinding was performed to obtain ore pulp to be separated, wherein the weight of minerals with a particle size less than or equal to 0.074 mm accounted for 90% of the total weight.

In S7, water was added to the ore pulp to be separated to obtain floatation pulp with mass percent concentration of 30%, and then floatation including one time of roughing, one time of concentration and one time of scavenging was performed to obtain final phosphate concentrates, wherein the specific operation included the following steps:

In A1, 3000 g/t green ore of an inhibitor and 800 g/t green ore of a collector were added into the floatation pulp, and stirring and aeration were performed to obtain roughing concentrates and roughing tailings.

In A2, 600 g/t green ore of an inhibitor and 80 g/t green ore of a collector were added into the roughing concentrates, and stirring and aeration were performed to obtain the final phosphate concentrates and concentration middlings.

In A3, 1200 g/t green ore of an inhibitor and 250 g/t green ore of a collector were added into the roughing tailings, and stirring and aeration were performed to obtain scavenging concentrates and final tailings.

Herein, the concentration middlings and the scavenging concentrates were respectively returned to step A1, and steps A1-A3 were repeated.

The inhibitor included 6 parts of sodium tripolyphosphate, 3 parts of hexametaphosphate and 3 parts of phosphoric acid by weight. The collector included 5 parts of sodium vegetable oleate and 1 part of dodecyl phosphate by weight.

A method for preparing the collector included adding NaOH solution into mixed solution of vegetable oil and dodecyl phosphate, wherein the mass percent concentration of NaOH was 20%, and performing heating for reaction for 3 h at 80° C. to obtain.

Herein, the vegetable oil included cottonseed oil, rice bran oil and castor oil. The weight ratio the NaOH solution to the mixed solution is 0.2:1.

Comparative Example 1

The indexes of separating medium-grade and low-grade mixed collophanite in example 1 of the present application were compared with that in comparative example 1, the medium-grade and low-grade mixed collophanite in example 1 was used in comparative example 1, and the ore dressing process was the technical solution recorded in example 1 in Chinese patent literature CN201510991054.3 (this comparative example was compared with the prior art and was used to prove that the ore dressing process of the present application had a better effect).

Comparative Example 2

The indexes of separating medium-grade and low-grade mixed collophanite in example 1 of the present application were compared with that in comparative example 2, the medium-grade and low-grade mixed collophanite in example 1 was used in comparative example 2, the ore dressing process had a difference lying in directly performing ore grinding to the green ores to obtain ore pump to be separated without performing steps S1-S5 in example 1, and other conditions were the same as that in example 1 of the present application except the amount of used chemicals, ore grinding fineness and subsequent process flow (this comparative example was compared with the technical solution without photoelectric separation steps and was used to prove that the ore dressing process of the present application had a better effect).

Comparative Example 3

The indexes of separating medium-grade and low-grade mixed collophanite in example 1 of the present application were compared with that in comparative example 3, the medium-grade and low-grade mixed collophanite in example 1 was used in comparative example 3, the ore dressing process had a difference lying in replacing the collector with fatty acid salt mainly including sodium oleate in the prior art and replacing the inhibitor with sulfuric acid and phosphoric acid at a mass ratio of 5:1 in the prior art, and other conditions were the same as that in example 1 of the present application except the amount of used chemicals, ore grinding fineness and adopted process flow (this comparative example was compared with the technical solution in which the collector and the inhibitor were replaced with the chemicals in the prior art at the same time, and was used to prove that the ore dressing process of the present application had a better effect).

Comparative Example 4

The indexes of separating medium-grade and low-grade mixed collophanite in example 1 of the present application were compared with that in comparative example 4, the medium-grade and low-grade mixed collophanite in example 1 was used in comparative example 4, the ore dressing process had a difference lying in replacing the collector with fatty acid salt mainly including sodium oleate in the prior art, and other conditions were the same as that in example 1 of the present application except the selection of inhibitor, the amount of used chemicals, ore grinding fineness and adopted process flow (this comparative example was compared with the technical solution in which the collector was replaced with the chemical in the prior art, and was used to prove that the ore dressing process of the present application had a better effect).

Comparative Example 5

The indexes of separating medium-grade and low-grade mixed collophanite in example 1 of the present application were compared with that in comparative example 5, the medium-grade and low-grade mixed collophanite in example 1 was used in comparative example 5, the ore dressing process had a difference lying in replacing the inhibitor with sulfuric acid and phosphoric acid at a mass ratio of 5:1 in the prior art, and other conditions were the same as that in example 1 of the present application except the selection of collector, amount of used chemicals, ore grinding fineness and adopted process flow (this comparative example was compared with the technical solution in which the inhibitor was separately replaced with the chemical in the prior art, and was used to prove that the ore dressing process of the present application had a better effect).

Comparative Example 6

The indexes of separating medium-grade and low-grade mixed collophanite in example 1 of the present application were compared with that in comparative example 6, the medium-grade and low-grade mixed collophanite in example 1 was used in comparative example 6, the ore dressing process had a difference lying in removing magnesium through reverse floatation by using the chemical system in the examples and then removing silicon through direct floatation by using sodium carbonate and dodecamine, the reverse floatation chemical system, ore grinding fineness and industrial flow were the same as that in example 1 of the present application, the direct floatation used the concentrate product obtained after magnesium removal as raw materials, the pH value was regulated to about 9, and 1000 g/t of sodium carbonate and 500 g/t of dodecamine were added as the collector.

Comparative Example 7

The indexes of separating medium-grade and low-grade mixed collophanite in example 1 of the present application were compared with that in comparative example 7, a different of comparative example 7 form example 1 lay in that no sodium tripolyphosphate and hexametaphosphate were added into the inhibitor, and other conditions were the same as that in example 1 of the present application except the amount of used chemicals, ore grinding fineness and adopted process flow.

Comparative Example 8

The indexes of separating medium-grade and low-grade mixed collophanite in example 1 of the present application were compared with that in comparative example 8, a different of comparative example 8 form example 1 lay in that no sodium tripolyphosphate was added into the inhibitor, and other conditions were the same as that in example 1 of the present application except the amount of used chemicals, ore grinding fineness and adopted process flow.

Comparative Example 9

The indexes of separating medium-grade and low-grade mixed collophanite in example 1 of the present application were compared with that in comparative example 9, a different of comparative example 9 form example 1 lay in that no hexametaphosphate was added into the inhibitor, and other conditions were the same as that in example 1 of the present application except the amount of used chemicals, ore grinding fineness and adopted process flow.

The comparison of the experimental results of examples 1-3 and comparative examples 1-9 was shown in the following table (there was a slight difference in the grade of green ores between comparative examples 1-9 and example 1, because there was a human error in the experimental operation, which was a normal phenomenon):

| Group | Product | Yield % | Grade % | Recovery rate % |
|---|---|---|---|---|
| Example 1 | Final phosphate concentrate | 49.93 | 32.84 | 77.03 |
| | Tailing | 50.07 | 9.76 | 22.96 |
| | Green ore | 100.00 | 21.29 | 100.00 |
| Comparative example 1 | Final phosphate concentrate | 42.29 | 30.54 | 59.94 |
| | Tailing | 57.71 | 14.96 | 40.06 |
| | Green ore | 100.00 | 21.55 | 100.00 |
| Comparative example 2 | Final phosphate concentrate | 48.47 | 27.84 | 63.64 |
| | Tailing | 51.53 | 14.96 | 36.36 |
| | Green ore | 100.00 | 21.20 | 100.00 |
| Comparative example 3 | Final phosphate concentrate | 50.41 | 28.84 | 67.74 |
| | Tailing | 49.59 | 13.96 | 32.26 |
| | Green ore | 100.00 | 21.46 | 100.00 |
| Comparative example 4 | Final phosphate concentrate | 46.92 | 30.54 | 67.57 |
| | Tailing | 53.08 | 12.96 | 32.43 |
| | Green ore | 100.00 | 21.21 | 100.00 |
| Comparative example 5 | Final phosphate concentrate | 52.62 | 28.54 | 70.98 |
| | Tailing | 47.38 | 12.96 | 29.02 |
| | Green ore | 100.00 | 21.16 | 100.00 |
| Comparative example 6 | Final phosphate concentrate | 41.18 | 33.08 | 63.69 |
| | Tailing | 58.82 | 13.20 | 36.31 |
| | Green ore | 100.00 | 21.39 | 100.00 |
| Comparative example 7 | Final phosphate concentrate | 47.47 | 31.71 | 70.91 |
| | Tailing | 52.53 | 11.76 | 29.09 |
| | Green ore | 100.00 | 21.23 | 100.00 |
| Comparative example 8 | Final phosphate concentrate | 46.94 | 32.71 | 71.10 |

-continued

| Group | Product | Yield % | Grade % | Recovery rate % |
|---|---|---|---|---|
| | Tailing | 53.06 | 11.76 | 28.90 |
| | Green ore | 100.00 | 21.59 | 100.00 |
| Comparative example 9 | Final phosphate concentrate | 47.57 | 30.71 | 68.59 |
| | Tailing | 52.43 | 12.76 | 31.41 |
| | Green ore | 100.00 | 21.30 | 100.00 |
| Example 2 | Final phosphate concentrate | 43.80 | 32.64 | 72.20 |
| | Tailing | 56.20 | 9.80 | 27.80 |
| | Green ore | 100.00 | 19.80 | 100.00 |
| Example 3 | Final phosphate concentrate | 37.26 | 30.84 | 67.36 |
| | Tailing | 62.74 | 8.87 | 32.64 |
| | Green ore | 100.00 | 17.06 | 100.00 |

As can be seen from the above table, compared with example 1, the yield, grade and recovery rate of the final phosphate concentrates obtained in comparative example 1 decrease significantly, and the yield, grade and recovery rate of the obtained tailings increase significantly; for comparative examples 2 and 4, the yield of the obtained final phosphate concentrates decreases slightly, the grade and recovery rate of the obtained final phosphate concentrates decrease significantly, the yield of the obtained tailings increases slightly, and the grade and recovery rate of the obtained tailings increase significantly; for comparative examples 3 and 5, the yield of the obtained final phosphate concentrates increases, the grade and recovery rate of the obtained final phosphate concentrates decrease significantly, the yield of the obtained tailings decreases, and the grade and recovery rate of the obtained tailings increase significantly. Accordingly, it can be seen that the process in example 1 of the present can more fully separate the phosphate concentrates in the green ores than the process in comparative examples 1-5; at the same time, although the yield in comparative examples 3 and 5 increases, their grade decreases significantly, which indicates that other impurities float up together, proving that the collector performance in comparative examples 3 and 5 is poorer than that in example 1.

Compared with example 1, the yield, grade and recovery rate of the obtained final phosphate concentrates in comparative examples 7-9 decrease significantly, which indicates that the effect of the combined use of phosphoric acid, sodium tripolyphosphate and hexametaphosphate in the present application is significantly improved compared with the single use or separate use of each component, that is, there is a synergistic effect among the components of the inhibitor in the present application.

Therefore, the ore dressing process for medium-grade and low-grade mixed collophanite provided by the present application achieves the effects of high ore dressing efficiency, small amount of ores for floatation, low energy consumption, low floatation chemical cost and environmental friendliness.

What are described above are just preferred examples of the present application. It should be understood that the present application is not limited to the examples disclosed herein, and should not be regarded as excluding other examples, but may be used for various other combinations, modifications and environments, and may be modified through the above-mentioned teaching or technology or knowledge in the related art within the scope of the concept described herein. However, any modifications and changes made by those skilled in the art without departing from the spirit and scope of the present application shall fall within the scope of protection defined by the attached claims of the present application.

What is claimed is:

1. An ore dressing process for a medium-grade and low-grade mixed collophanite, comprising the following steps:

S1: crushing green ores to obtain crushed ores, wherein a particle size of the crushed ores is less than or equal to 60 mm;

S2: screening the crushed ores to obtain fine-fraction ores and coarse-fraction ores divided into at least two size fractions, wherein a particle size of the fine-fraction ores is less than or equal to 8 mm, and a particle size of the coarse-fraction ores is more than 8 mm;

S3: respectively performing a photoelectric separation to the coarse-fraction ores of different size fractions to obtain photoelectric separation concentrates and photoelectric separation tailings of each size fraction;

S4: combining the photoelectric separation concentrates of the each size fraction to obtain pre- enriched concentrates;

S5: combining the fine-fraction ores and the pre-enriched concentrates, and then performing an ore grinding to obtain minerals to be separated;

S6: adding water to the minerals to be separated to obtain a floatation pulp, and then performing a floatation to obtain phosphate concentrates and tailings; wherein in step S6, the floatation comprises at least one time of roughing, at least one time of concentration and at least one time of scavenging, and further comprises the following steps:

Al: adding an inhibitor and a collector into the floatation pulp, and performing stirring and aeration to obtain roughing concentrates and roughing tailings;

A2: adding the inhibitor and the collector into the roughing concentrates, and performing stirring and aeration to obtain final phosphate concentrates and concentration middlings;

A3: adding the inhibitor and the collector into the roughing tailings, and performing stirring and aeration to obtain scavenging concentrates and final tailings; and wherein the inhibitor is a mixed acid;

the inhibitor comprises 4-6 parts of sodium tripolyphosphate, 2-3 parts of hexametaphosphate and 2-3 parts of phosphoric acid by weight; and the collector comprises 4-5 parts of sodium vegetable oleate and 1 part of dodecyl phosphate by weight.

2. The ore dressing process according to claim 1, wherein in step S3, the ore dressing process further comprises a step of respectively and repetitively performing the photoelectric separation by using the photoelectric separation tailings of the each size fraction as raw materials.

3. The ore dressing process according to claim 2, wherein in step S3, a grade of $P_2O_5$ in the photoelectric separation tailings at a last time is less than or equal to 10%.

4. The ore dressing process according to claim 1, wherein in step S5, a weight percentage of the minerals to be separated with a particle size less than or equal to 0.074 mm in an ore pulp to be separated is 75%-90%.

5. The ore dressing process according to claim 1, wherein the sodium vegetable oleate is prepared from a NaOH solution and a vegetable oil.

6. The ore dressing process according to claim 5, wherein a method for preparing the collector comprises adding the NaOH solution into a mixed solution of the vegetable oil and the dodecyl phosphate, and performing heating for a reaction to obtain the collector.

7. The ore dressing process according to claim 6, wherein the vegetable oil comprises at least one selected from the group consisting of cottonseed oil, rice bran oil, castor oil, corn oil and soybean oil.

8. The ore dressing process according to claim 6, wherein a weight ratio the NaOH solution to the mixed solution is 0.1-0.2:1.

9. The ore dressing process according to claim 6, wherein a reaction temperature of the heating for the reaction is 60-80° C. and a reaction time is 3-5 hours.

10. The ore dressing process according to claim 1, wherein in step A1, an amount of the inhibitor added is 2000-3000 g/t green ore and/or an amount of the collector added is 400-800 g/t green ore.

11. The ore dressing process according to claim 1, wherein in step A2, an amount of the inhibitor added is 400-600 g/t green ore and/or an amount of the collector added is 40-80 g/t green ore.

12. The ore dressing process according to claim 1, wherein in step A3, an amount of the inhibitor added is 800-1200 g/t green ore and/or an amount of the collector added is 150-250 g/t green ore.

* * * * *